April 2, 1940.　　K. L. HANSEN ET AL　　2,195,962
WELDING APPARATUS
Filed Oct. 16, 1936　　7 Sheets-Sheet 4

INVENTORS
Alphonse V. Huennekens
Klaus L. Hansen
BY Charles & French
ATTORNEYS

April 2, 1940.  K. L. HANSEN ET AL  2,195,962

WELDING APPARATUS

Filed Oct. 16, 1936  7 Sheets-Sheet 6

INVENTOR.
Alphonse V. Hunnekens
Klaus L. Hansen
BY Juarles & French
ATTORNEYS

Patented Apr. 2, 1940

2,195,962

UNITED STATES PATENT OFFICE 2,195,962

WELDING APPARATUS

Klaus L. Hansen and Alphonse V. Huennekens, Milwaukee, Wis., assignors to Harnischfeger Corporation, Milwaukee, Wis., a corporation of Wisconsin Application October 16, 1936, Serial No. 105,989

14 Claims. (Cl. 219—8)

The invention relates to welding apparatus.

One of the objects of the invention is to provide an automatic welding apparatus using ordinary coated welding rods in which the rods stored in a hopper are successively removed therefrom preferably directly by the electrode holder which is mounted to move from a rod receiving position to a welding position in which the rod carried thereby is brought into welding association with the work to form a weld as the work and head move relative to each other, the arc being automatically maintained by the automatic adjustment of the electrode holder during welding.

A further object of the invention is to provide an automatic welding apparatus in which a welding rod carrier moves between a storage receptacle for ordinary coated welding rods and the work and is provided with a welding rod gripper having a charging position in which it is adapted to grip one end of the foremost rod in said receptacle and thereafter move with said rod to a welding position.

A further object of the invention is to provide an automatic welding apparatus in which the welding head and work move relative to each other and in which the starting and stopping of the welding operation is coordinated with the starting and stopping of the travel of the work relative to the head.

A further object of the invention is to provide an automatic welding apparatus that may be readily adapted for quantity production welding of parts of various sizes and shapes.

The invention further consists in the several features hereinafter set forth and more particularly defined by claims at the conclusion hereof.

The apparatus includes a hopper or storage chamber H for storing a quantity of coated welding rods A, which hopper is mounted on the welding head comprising a frame F and an electrode carrier B. The frame F may be stationary or movable relative to the work W. In the present instance the frame F is shown as mounted on the usual transversely movable tool carrying slide C of an ordinary metal planer, and the work W is mounted on the reciprocatory bed D of said planer. Thus, when the frame F is stationary and the work W moves with the bed, the welding metal will be deposited on the work from the rod A mounted in the head B and automatically fed to the work in a line along the same; and when the work W is stationary and the frame is moved, a similar effect is produced with the line of the weld running at right angles to that previously described. The frame F is clamped to the slide C, so that it may be angularly adjusted in a plane parallel to that of the slide guides, and the frame is also articulated through the hinge connection provided by the relatively vertically disposed pivot rod P and the parts P' mounted to have limited turning movement thereon in a horizontal plane whereby the frame F may be shifted laterally relative to the work W during the movement of the work. It is, therefore, apparent that through relative movement between the head and the work the welding metal may be deposited on the work and depending upon the direction of movement of one or both of those parts will depend the configuration of the welding deposit.

The hopper H is formed as a box-like structure 20 having a series of slotted partitions 21 mounted therein, the slots 22 being of generally S-shaped formation and about the width of the electrode A being handled so as to guide a series of these electrodes in a column from a charging position g to a position at the bottom of the box where they may be successively grabbed by the electrode holder E. Before removal the rods A move down to a shelf or bottom portion 23 of the hopper and the foremost electrode abuts at its pointed end a' against a fixed stop 24 while the other uncoated end a of the electrode together with those behind and above it is held against falling out of the holder by a shiftable gate member 25 here shown as a lever pivotally mounted intermediate its ends on a shaft 26 mounted on the hopper and normally urged by a spring 27 into electrode holding position but provided with an adjustable stop in the form of a screw 28 for engagement with the electrode holder so that said member 25 will be swung out of the way by said holder into the position shown in Fig. 10 when said holder moves up to get a rod.

The carrier B is mounted to reciprocate vertically in the frame F and has a frame 29 provided with spaced side plates 29' carrying spaced sets of front guide rollers 30 running on vertically disposed rails 30' formed by portions of the frame F and spaced rear guide rollers 31 running on a vertically disposed welding current supply bus bar 32 secured to the frame F, said frame being in the form of a square tube having the longitudinally extending slot 33 in its front face.

Figure 5:
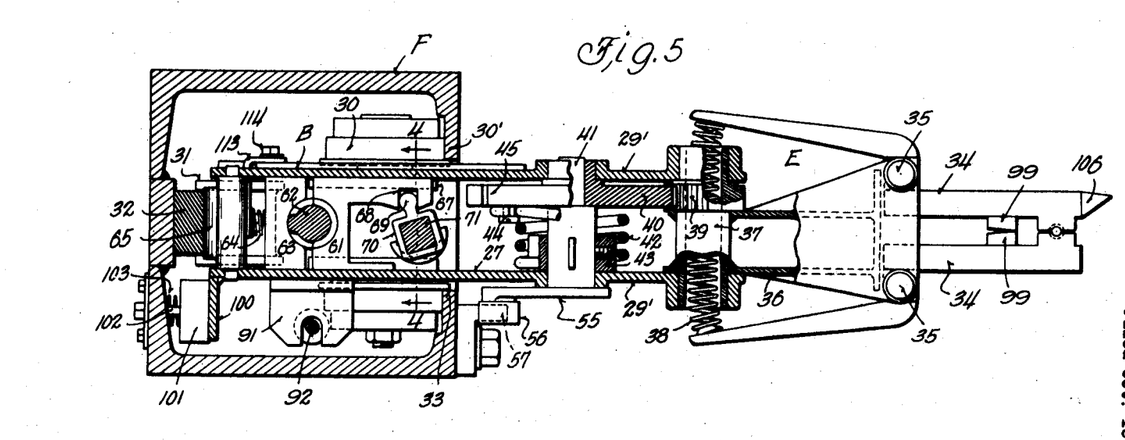
Fig. 5 is a detail horizontal sectional view taken on the broken line 5—5 of Fig. 2.

The carrier B has an electrode holder or gripper E here shown as a pair of spring closed pliers or pincers, each member 34 of which is pivotally mounted intermediate its ends on a shaft 35 carried by a supporting member 36 here shown as an oscillatory support provided with a hollow pivot pin portion 37 welded thereto and journalled in the side plates 29' of the head as best shown in Fig. 5. The jaws of the gripper are normally urged to a closed position by a spring 38 passing through the hollow pivot 37 and engaging the handle portions of said pliers.

One side of the pivot has a segmental gear 39 formed thereon which meshes with a segmental gear 40 on a shaft 41 journalled at one end in one of the plates 29' and at its other end in a boss of the part 40 journalled in the other of the plates 29'. A torsion spring 42 has one end secured to a collar 43 keyed to the shaft 41, and the other end is anchored at 44 to the gear 40 which also has a notch 45 formed therein engageable with a spring pressed pawl or dog 46 secured to a shaft 47 eccentrically mounted in bearing blocks 47' journalled in the plates 29' of the carrier frame 29 (see Fig. 7). The shaft 47 has an exteriorly disposed operating lever 48 secured thereto and provided with a roller 49. The bearings 47' are adjustable relative to the plates 29' so as to change the angular position of the shaft 47 and the pawl 46 relative to the gear 40 by arms 50 secured to the bearing blocks 47' and each having an arcuate slot 51 therein through which a clamping bolt 52 passes to clamp the arms 50 and hence the bearing members 47' in adjusted position relative to the carrier frame plates 29'. The pawl 46 is normally pressed to an engaging position with the gear 40 by a spring 53 mounted in a support 54 on the carrier. The shaft 41 has an exteriorly disposed operating lever 55 secured thereto and provided with a roller 56. The levers 48 and 55 cooperate with a cam 57 on the main frame F as the carrier B nears the end of its downward travel as hereinafter described. The head B also has a jaw opener cam or wedge 58 (see Figs. 1, 2, and 6) pivotally supported thereon at 59 and normally held in a jaw opening position by a tension spring 60 mounted in the suport 54.

Figures 2, 4:
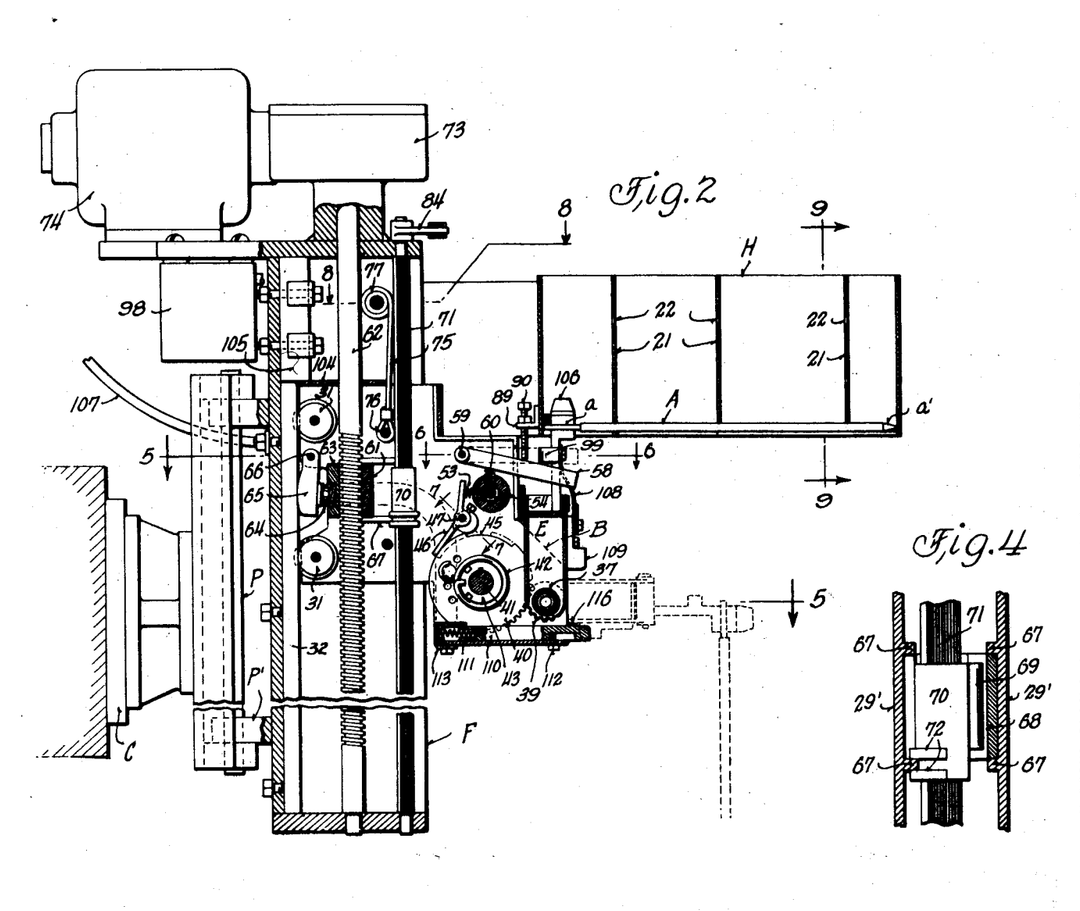
Fig. 2 is a vertical sectional view taken on the line 2—2 of Fig. 3 with the electrode holder in a rod gripping position.
Fig. 4 is a detail transverse sectional view taken on the line 4—4 of Fig. 5.

The carrier B also carries a releasable feed nut formed of a half nut section 61 shown in Figs. 2 and 5 engageable with a feed screw 62. A spacer or backing member 63 of semi-cylindrical curvature is disposed adjacent the feed screw at the opposite side from that of the nut member 61 and acts as a support for a pressure spring 64 which yieldingly urges a conductor shoe 65 into sliding contact with the bus bar 32, said shoe being pivotally mounted at its upper end on a pin 66 mounted on the carrier B. The section 61 of the nut is slidably mounted in spaced guides 67 formed on the carrier frame side plates 29' (see Figs. 4 and 5) and has a notch formed therein engaged by the curved end 69 of an actuator lever 70 slidably mounted on a square rod 71 journalled at its upper and lower ends in the frame F. The actuator moves with the carrier through a keyed connection therewith provided by the spaced flanges 72 engageable on opposite sides of one of the guides 67.

The feed screw 62 is constantly rotated through a reduction gearing driving connection indicated generally at 73 with a feed motor 74. The feed screw 62 acts to feed the carrier B downwardly while the feed nut 61 is engaged therewith, and on the release of the feed nut the carrier B is returned to its upper position by the action of a hoisting mechanism; except during welding the rotation of the feed screw may be reversed to move the carrier B upwardly to provide the proper length of the welding arc.

Figure 8:
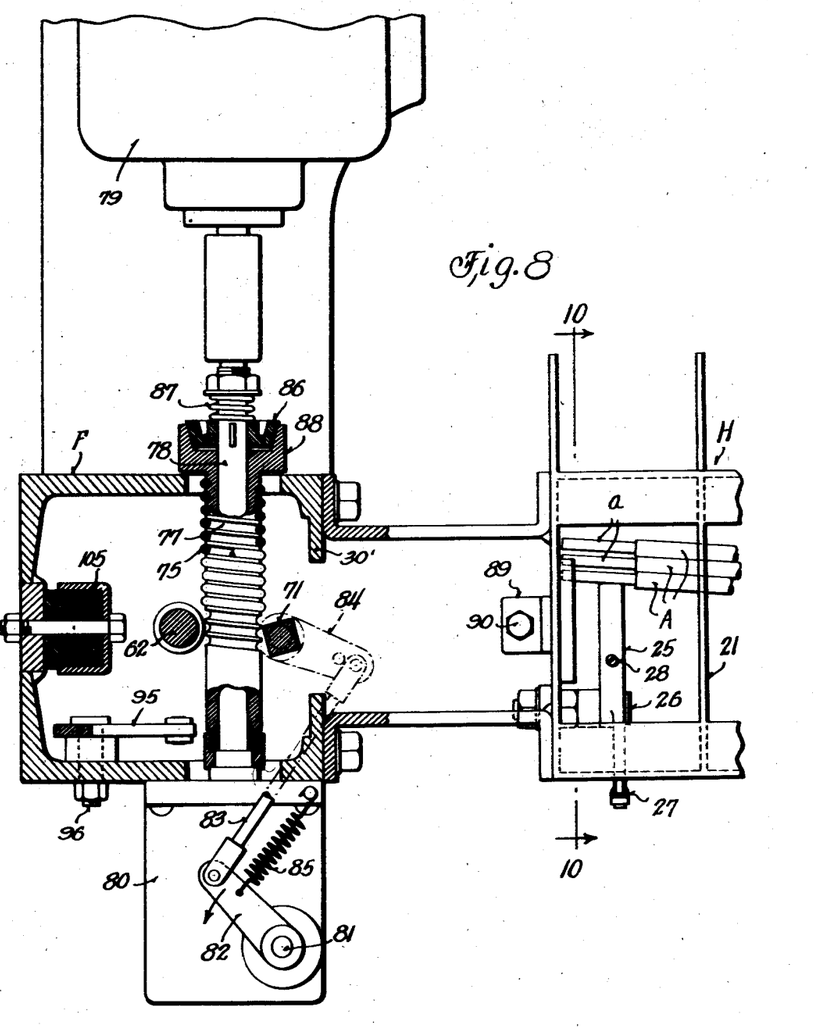
Fig. 8 is a detail vertical sectional view taken on the line 8—8 of Fig. 2.

The hoisting mechanism, as shown in Figs. 2 and 8, includes a cable 75 secured at one end to the head at 76 and wound around a helically grooved drum 77 loosely mounted on a shaft 78 journalled at the upper end of the frame F and directly connected and driven by a high speed motor 79. This shaft has mounted on it enclosed within the housing 80 a flyball governor mechanism including weights 80' such as is commonly used for regulating the throttle valve of internal combustion engines, and as the details of the governor form no part of the present invention, the same has not been shown in detail. The oscillatory shaft 81 having arms 81' operated by this governor is shown as provided with a lever arm 82 connected by a link 83 to a lever arm 84 secured to the upper end of the nut actuator shaft 71. The leverage connections above described are normally biased to a nut engaging position by a spring 85. The shaft 78 has a cone clutch member 86 slidably keyed thereto and normally urged by a spring 87 into engagement with the mating clutch member 88 on the hoist drum 77.

The hopper H carries a bracket 89 having a stop screw 90 adjustably mounted thereon and adapted to engage the jaw opener cam 58 to release said cam as the electrode holder is moved to a rod gripping position such as shown in Fig. 2.

Figure 1:
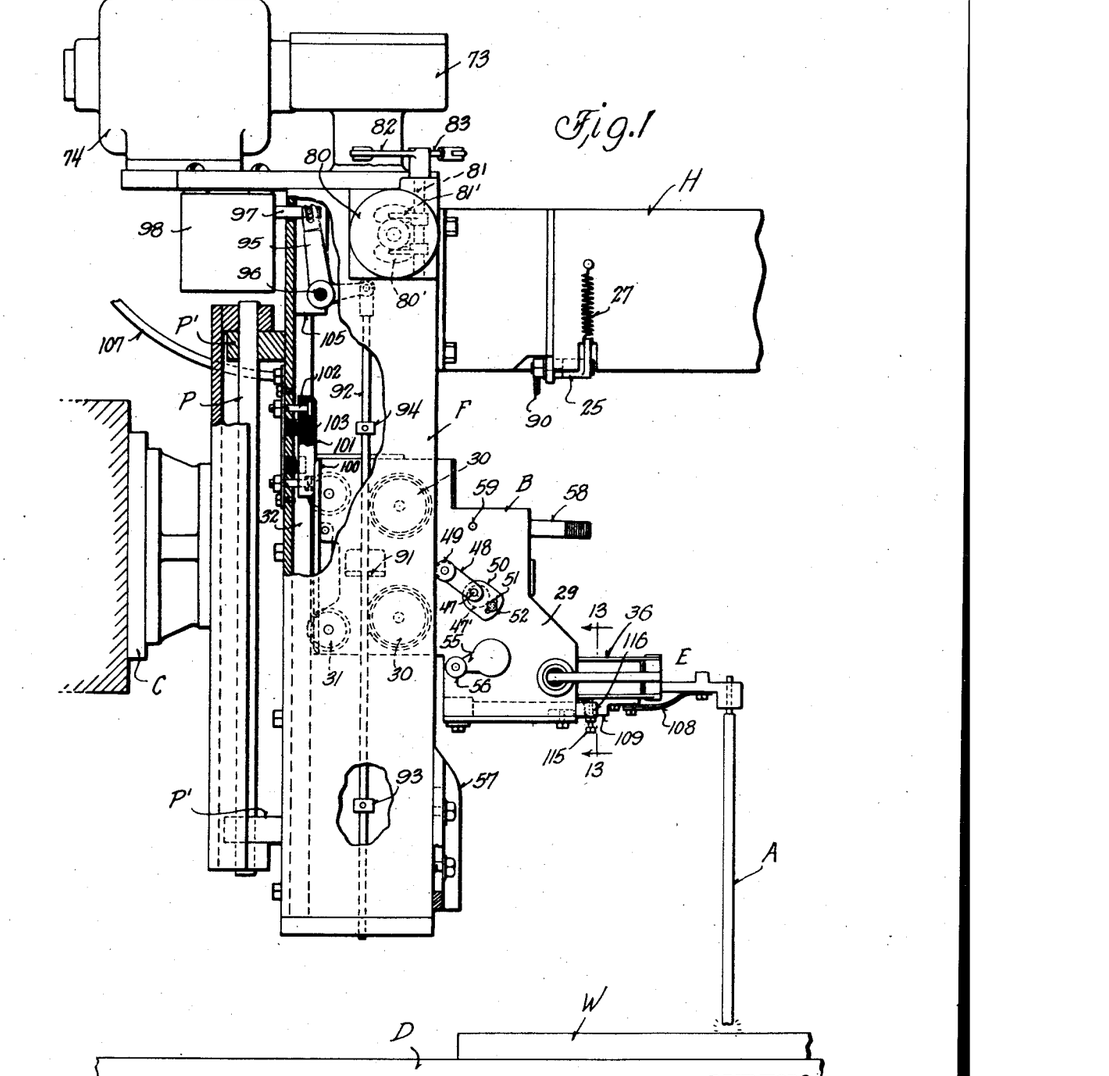
Fig. 1 is a side elevation view of apparatus embodying the invention, parts being broken away and parts being shown in section.

The carrier B has a stop member 91, Fig. 5, secured thereto and slidably mounted relative to a limit stop rod 92 having limit stops 93 and 94 adjustably clamped thereto by screws or other suitable fastenings, Fig. 1. This stop rod 92 is guided at its lower end in the bottom portion of the frame F and operatively connected at its upper end to a bell crank lever 95 pivotally supported at 96 and having its other end connected to a limit switch actuating member 97. The limit switch (not shown in detail) is mounted in the housing 98 and acts to control the starting and stopping of the motor 79.

Figure 6:
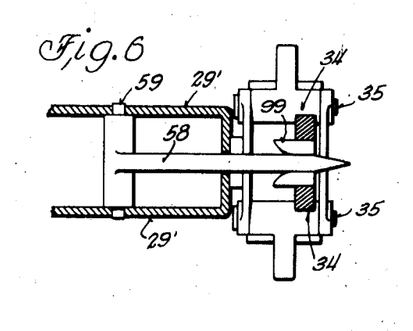
Fig. 6 is a detail sectional view taken on the line 6—6 of Fig. 2.
Figure 7:
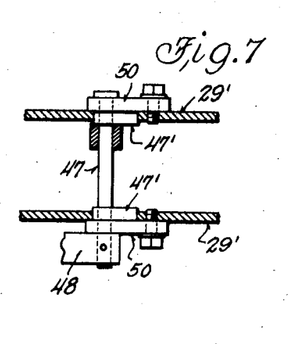
Fig. 7 is a detail sectional view taken on the line 7—7 of Fig. 2.

The carrier B is shown in Fig. 1 in a position in which the welding electrode A is in welding association with the work W, and as the feed screw 62 revolves, the carrier B is moved downwardly along the frame F as the welding rod A is used up by its deposit on the work. As the carrier B nears the end of its travel, the roller 56 on the lever 55 comes in contact with the cam 57, and said lever is turned clockwise as shown by the arrow in Fig. 1 against the tension of the torsion spring 42, it being noted that normally the pawl 46 shown in Fig. 2 acts to engage the notch 45 of the gear member 40 so as to hold said gear member stationary so that the spring 42 may be wound up and put under tension when said lever 55 swings upwardly. Thereafter, and as the carrier B is completing its downward movement, the roller 49 on the arm 48 engages the cam 57 so as to swing said arm 48 upwardly, thus turning the shaft 47 and consequently swinging the pawl 46 upwardly out of engagement with the notch 45. Under these conditions the coil spring 42 exerts a sudden and powerful torsional pull on the gear 40 turning it in a clockwise direction and thereby turning the gear 39 and the pivot shaft 37 in the opposite direction and thus swinging the gripper member E with the grippers thereon upwardly until the tapered intermediately disposed blocks 99 of the grippers are engaged by the wedge-shaped cam 58 which thereby acts to move the gripper members apart as the grippers reach their upward movement as shown in Fig. 6. Opening the jaws releases the stub end of the electrode A. Just about this time the carrier B has moved to its lowermost position in which the stop member 91 thereon engages the limit stop 93, thus pushing the rod 92 downwardly and through the lever 95 pulling the member 97 forwardly to actuate the limit switch which starts the operation of the pull up motor 79. During the first part of the rotation of the motor 79 the clutch members 87 and 88 are free to slip and do so slip while the motor through its shaft 78 is bringing the governor mechanism 80 up to such a speed as to cause the governor to operate the arm 82 and through said arm and the link 83 and arm 84 turn the shaft 71 in a clockwise direction as viewed in Figs. 5 and 8 so that the actuator 70 will move the split nut member 61 out of engagement with the feed screw shaft 62.

Immediately on disengagement of the feed screw the clutch members 87 and 88 take hold, and the drum 77 is rapidly rotated to wind up the cable 75 thereon and thus rapidly pull the carrier B from its lower position to an upper charging position adjacent the hopper H. As the carrier nears its upper position, its momentum is checked by the engagement of flange portion 100 thereon with a brake shoe 101 of suitable material slidably mounted on guide bolts 102 secured to the frame F and yieldingly urged into the path of the flange 100 by springs 103 (see Figs. 1 and 5). After this braking action on the carrier it finally comes to rest when its top portion 104 engages a stop block 105 of relatively dense rubber mounted on the frame F (see Figs. 1, 2, and 8).

Figures 3, 13, 14:
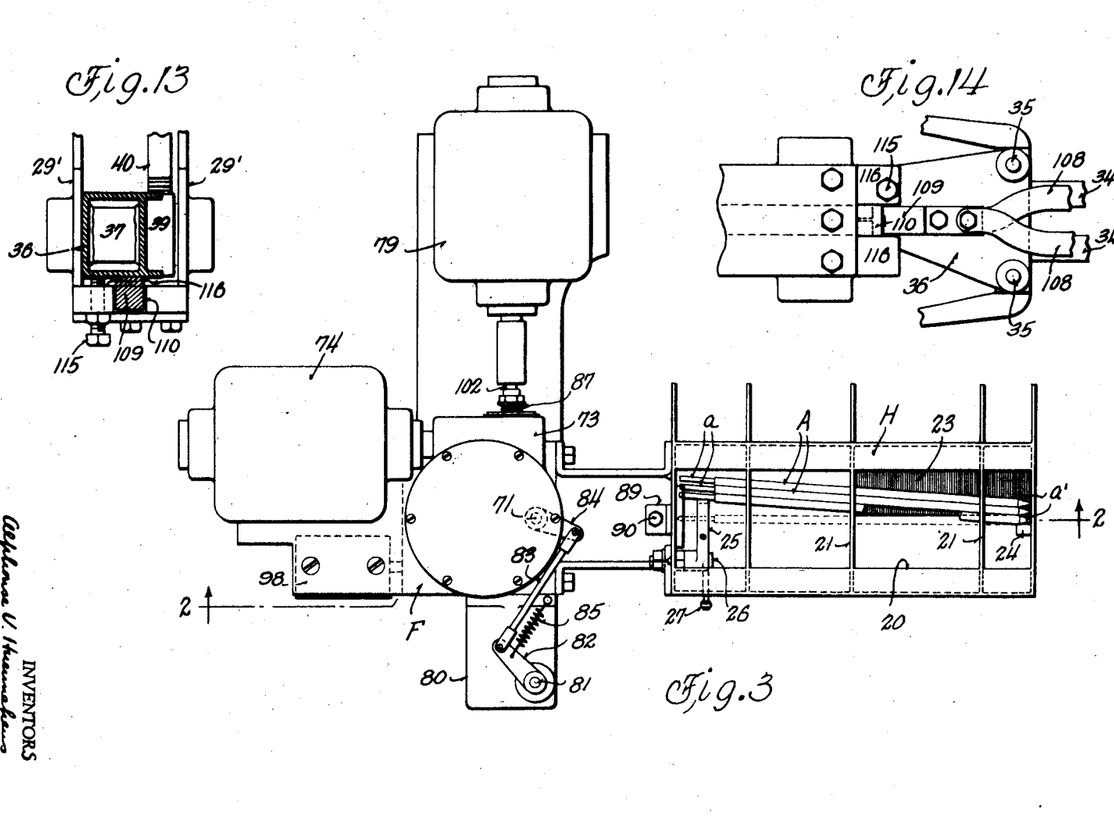
Fig. 3 is a top plan view of the apparatus, parts being broken away.
Fig. 13 is a detail transverse sectional view taken on the line 13—13 of Fig. 1.
Fig. 14 is a partial bottom plan view of the carrier showing certain details thereof.
Figure 9:
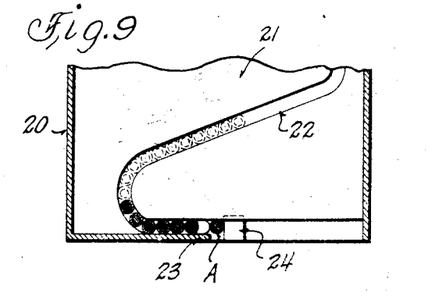
Fig. 9 is a detail vertical sectional view taken on the line 9—9 of Fig. 2.
Figure 10:
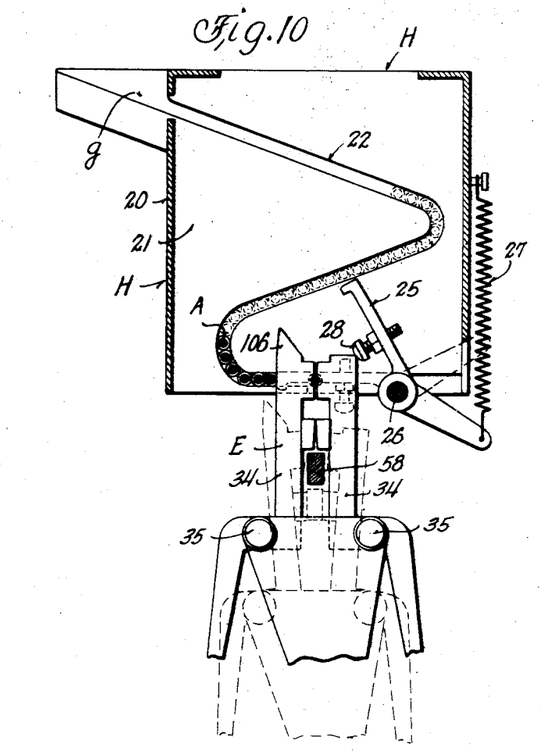
Fig. 10 is a detail sectional view taken on the line 10—10 of Fig. 8.

During the time the carrier B is moving from its lower position to its upper charging position adjacent the hopper H, the plier members are held open by the wedge member 58; and as these members in this condition approach their upper limit of travel, the shorter member strikes the gate member 25 and swings it up into the position shown in Fig. 10 while the pointed end 106 of the other plier member moves up between the uncoated end of the foremost or lowermost welding rod A in the hopper and the uncoated end of the rod adjacent thereto thereby separating the lowermost rod from the rest of the stack of rods while holding back the other rods. Then as the carrier B completes its upward movement, the stop screw 90 strikes the wedge member 58 and swings it downwardly as shown in Fig. 2 allowing the jaw members 34 to move to closed position under the action of the spring 38, and thus the uncoated end of the lowermost rod is automatically gripped between the jaws of the electrode holder E. It will be noted that as the holder E separates and grips the lowermost rod, it swings the uncoated end of said rod from a somewhat inclined position shown in Fig. 3 to the straight dotted line position shown therein, and then when the holder starts on its downward movement, the electrode moves down between the shelf 23 and the stop 24, as shown in Fig. 9, while the gate 25 under the action of its spring 27 swings back to the dotted line position shown in Fig. 10. Just as the upper charging movement of the carrier B is completed, the stop member 91 thereon engages the upper limit stop 94 of the rod 92 and moves said rod upwardly and hence the lever 95 so as to shift the actuator 97 and consequently the limit switch 98 to a switch opening position so as to stop further rotation of the motor 79. As soon as the motor 79 stops, the shaft 78 loses speed and eventually stops and thereby stops further operation of the governor 80, so that the usual release springs of the governor and the spring 85 acting through the lever arms 82 and 84 and link 83 turn the split nut actuator shaft 71 to a nut engaging position so that the motor 74, then in operation in turning the feed screw 62, acts to move the carrier B downwardly with the foremost electrode gripped by the holder E as previously described.

As the carrier B starts downwardly as soon as the gripped electrode moves below the hopper its forward or pointed end a' is free to swing downwardly, it being noted that the wedge member 58 is still in its lower position as shown in Fig. 2, so that the electrode with the electrode holder swings down to a welding position shown in dotted in Fig. 2 and in full in Fig. 1, and thereafter the pointed end a' is moved down into arcing engagement with the work W and then moved back a predetermined distance to maintain the desired welding arc.

The welding current is constantly supplied to the head through a conductor 107 connected with the bus bar 32 which through the shoe 65 and the frame of the carrier B carries it to the electrode holder and thence to the upper uncoated end of the electrode gripped thereby. In order to insure a good flow of current directly to the jaws of the holder flexible metal pigtails 108 connect each of the jaws with a contact block 109 secured to the frame portion 36 thereof, adapted to engage a plunger 110 slidably mounted on the carrier frame proper and yieldingly urged against said surface by a spring 111, said plunger being limited in its outward movement by a stop screw 112, and the base plate portion on which said plunger moves being connected directly by a flexible conductor strap 113 leading to that portion of the carrier at 114 directly adjacent the pivot shoe 65.

Figure 11:
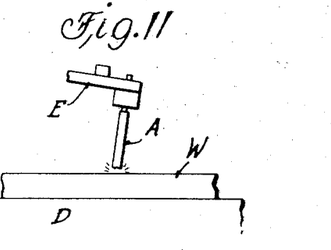
Fig. 11 is a detail view of the electrode and the work.
Figure 12:
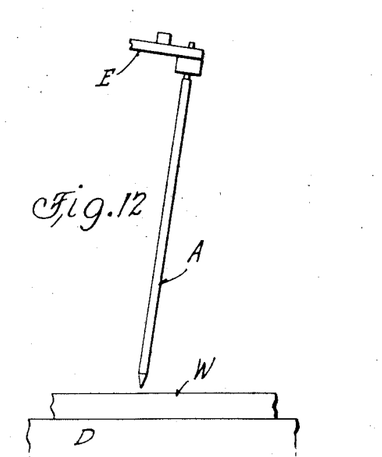
Fig. 12 is a view similar to Fig. 11 showing the electrode just before starting the weld.

In some types of welding the welding rod may assume a position substantially normal to the work while under other conditions of welding it may be desirable to tilt the electrode at an acute angle to the work as shown, for example, in Figs. 11 and 12 in which instance it will be noted that since the new electrode subtends a greater arc than the used one that an overlapping effect of the welding metal will be produced when using this adjustment of the holder. In order to permit adjustment to positions for either backward or forward inclination of the rod from normal, adjustable stops 115 are mounted on a block 116 straddling the plunger 110 and secured to the carrier frame and engageable with the bottom portion of the electrode holder member 36 to change its angle of tilt. As the changing of the welding position of the electrode holder changes the position of the gear 40, the position of the pawl 46 is shifted to accommodate this change by the proper adjustment of the shaft 47 of said pawl through the angular adjustment of the bearing blocks 47'.

Figure 15:
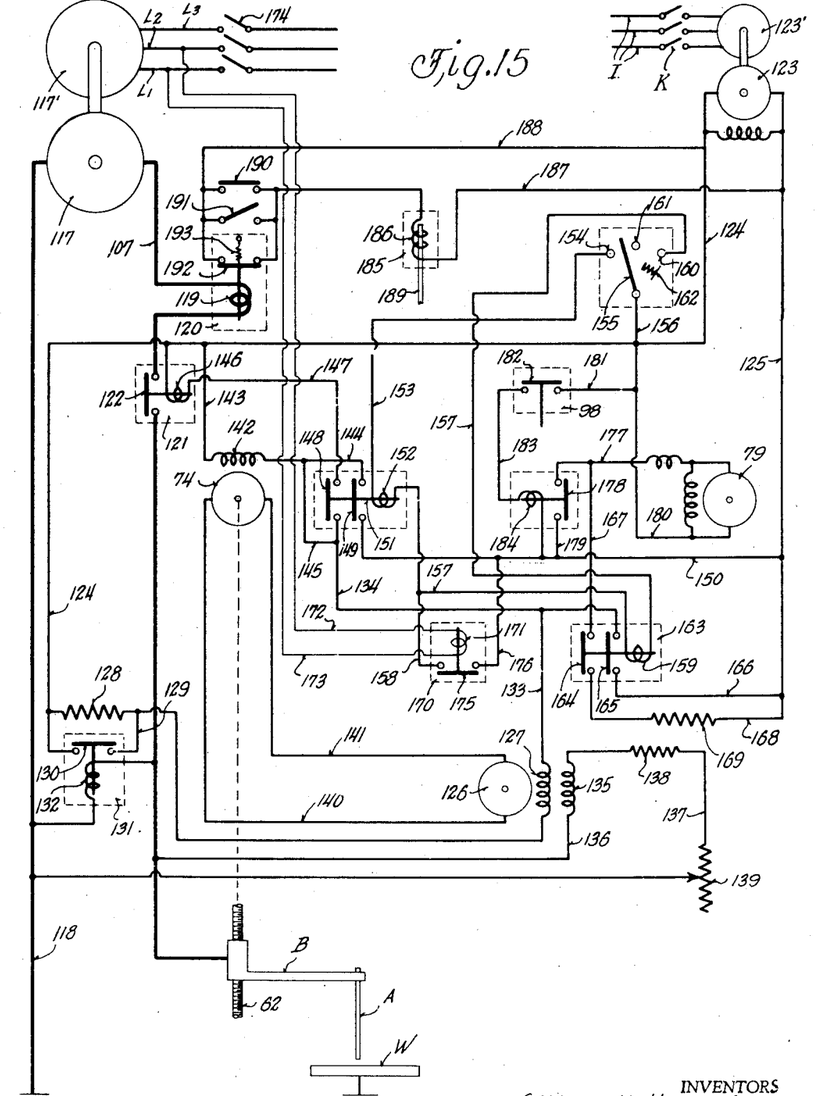
Fig. 15 is a circuit diagram of certain of the electrically controlled parts of the apparatus.

Referring to Fig. 15 wherein the electrical connections for furnishing current to the apparatus and controlling the same are shown, the numeral 117 designates a welding generator driven by a motor 117' and supplying welding current to the conductor 107 from which the current passes through the head and the electrode A to the work W and ground and from ground through a return conductor 118. The conductor 107 is shown as provided with a coil portion 119 for a series pulsating relay 120, and the welding current is controlled by a power off relay 121 whose armature 122 forms a bridging contact between portions of the conductor 107.

An auxiliary constant potential generator 123 driven by a motor 123' has conductors 124 and 125 leading therefrom. Another auxiliary generator 126 has a field circuit 127 connected at one end to the conductor 124 either through a resistance 128 or a shunt 129 around said resistance including the armature 130 of a relay 131 whose coil 132 is connected across the welding circuit conductors 107 and 118, the other side of said field circuit 127 being connected by a conductor 133 with a conductor 134. The generator 126 also has a field circuit 135 connected by a conductor 136 with the welding circuit conductor 107 and by a conductor 137 with the other welding circuit conductor 118 and including a fixed resistance 138 and a variable resistance 139.

The armature of the travel motor 74 is electrically connected to the armature of the generator 126 by the conductors 140 and 141. The field 142 of the motor 74 is connected at one side by the conductor 143 to the conductor 124 and at its other side to branch conductors 144 and 145. The coil 146 of the power off relay 121 is in a circuit conductor 147 connected at one end with the conductor 124 and at its other end adapted to be connected to the conductor 134 through the bridging switch contact 148. The conductor 144 is adapted to be connected to the supply conductor 125 by the bridging switch contact 149 and conductor 150. Both contacts 148 and 149 are parts of the starter switch for the motor 74 and are on the same solenoid operated member 151 whose control coil 152 is connected by a conductor 153 with a switch contact 154 which cooperates with a manually movable switch arm 155 connected by a conductor 156 with the conductor 124. The other side of the coil 152 is connected to conductors 157 and 158. The conductor 157 includes a reverse switch relay coil 159 and leads to a reversing switch contact 160. The switch arm 155 has an off position when on the button 161 and is thereafter movable against the pressure of a spring 162 to its reversing position.

The reversing switch relay 163 has bridging contacts 164 and 165 mounted on its armature. The contact 165 connects the conductor 134 with a conductor 166 leading to the return conductor 125 when the relay is closed. The bridging contact 164 connects a conductor 167 with a conductor 168 leading to the line 125 and containing a fixed resistance 169. A protective relay 170, to prevent operation of the carrier unless the welding generator 117 is operating, has its coil 171 connected by conductors 172 and 173 across the supply lines L₁ and L₂ for the drive motor 117' for the welding generator, the supply to these lines being controlled by any suitable switch as a three-throw switch 174. Whenever the welding generator 117 is running, the coil 171 will, therefore, be energized to pull up the armature 175 which connects the conductor 158 with a conductor 176 leading to the conductor 150.

The hoist or carrier return motor 79 is a shunt field motor whose lead 177 is connected through a switch contact 178 with a conductor 179 connected to the conductor 150. The other lead 180 of the motor 79 connects with conductors 156 and 124 and with a conductor 181 connected by the bridging contact 182 of the limit switch 98 with a conductor 183 including the starter switch operating coil 184 for the motor 79, the conductor 183 being connected at its other end to the conductor 150. The motor 123' for the constant potential generator 123 receives current from the supply lines I under the manual control of the three-pole switch K. This motor is also used to drive the armature of the generator 126.

With the above construction prior to starting the welding operation the switches 174 and K are closed, so that the generators 117 and 123 are operating, and current from the supply line passing through the conductors 172 and 173 is energizing the coil 171 to close the bridging contact 175. Then under ordinary welding operations the operator swings the switch arm 155 into contact with the contact 154, and current from the generator 123 then passes through the conductors 124 and 156, arm 155, contact 154, conductor 153, including starter coil 152, conductor 158, contact 175, conductor 176, conductors 150 and 125, thereby energizing the starter switch coil 152 for the motor 74 and bringing the contacts 148 and 149 to a closed position. As soon as this occurs, current from the generator 123 flowing through conductor 124 passes by way of conductors 143 and 144 through the field coil 142 of the motor 74 and across the bridge 149 to conductors 150 and 125 while current from the same conductor 124 passes through the power off relay coil 146, conductor 147, contact 148, conductors 134, 145, and 144 and thence through the contact 149 and conductor 150 to the return conductor 125. As soon as the power off relay 121 closes, the field 135 for the generator 126 is connected across the welding circuit.

With the starter switch connections established above current from the conductor 124 also passes through the resistance 128 to the field 127 and thence through conductors 133 and 134 to the conductor 145 and thence to the return line 125 through conductor 144, contact 149, and conductor 150. Thus the field 142 of the motor 74 is energized, and both fields of the generator 126 are energized and the generator 126 is supplying current to the armature of the motor 74 which acts to feed the carrier B downwardly. The field 127 is maintained at substantially constant excitation by the constant voltage generator 123 through the circuit connections above described. This excitation is substantially constant except at the moment when the electrode A contacts the work and short circuits the arc at which time the relay 131 is operated to close the shunt circuit 129 and thus cut out the resistance 128. The field 135 varies in strength with the voltage of the welding circuit being connected directly across the welding generator terminals. The voltage induced in the generator field 126 by the field 135 produces current in said generator which acts to turn the motor 74 in a direction to feed the welding carrier B downwardly. The field 127 induces a voltage in the opposite direction from that of the field 135 and acts to produce current in the generator 126 tending to turn the motor 74 in a direction to feed the carrier B upwardly. Thus the two fields 127 and 135 buck each other, but the field 127 does not predominate so long as the resistance 128 is included in its circuit, but as soon as the relay 131 short circuits this resistance and the field 135 is cut out, the field 127 predominates, so that after the short circuit is made, the electrode A will be raised slightly from the work to form the arc, and thereafter this arc is maintained through the constant action of the field 135 tending to feed the electrode downwardly and the counteracting effect of the field 127 and its resistance 128. The variable resistance 139 permits the current through the field 135 to be varied so as to bring it to such a value as to maintain the proper length of arc between the electrode A and the work W during the welding operation, and it will be also noted that the strength of the field 135 is proportional to the voltage of the welding circuit. Thus after the initial circuit and the striking of the arc, the arc is maintained by the counteracting effect of the two fields 135 and 127, and as the rod is used up, the field 135 acts to move the carrier downwardly so as to maintain the desired length of arc.

It has been noted that when the electrode is used up, the limit switch 98 is moved to closed position under the action of the carrier, thereby moving the bridging contact 182 into circuit closing position with the conductors 181 and 183 which under these conditions establishes a current flow from the generator 123 through conductor 124, conductors 180, 181, contact 182, conductor 183, through the starter switch coils 184 for the motor 79 to conductors 150 and 125. The closing of the starter switch brings contact 178 into contact with the conductors 177 and 179 so that the lead conductors 177 and 180 for the motor 79 are connected across the lines 124 and 150, and the motor 79 then operates to move the carrier B upwardly until said carrier on reaching the upper end of its movement disconnects the limit switch 98. The cycle of operations of the motors 74 and 79 are then repeated.

Under some conditions it may be necessary to move the carrier B upwardly under manual control, and for this purpose we have provided reversing switch means for the motor 74 acting in conjunction with the operation of the carrier return motor 79. This means includes the arm 155 which is movable through the off position 161 to contact with the contact 160 in a reverse position, it being held on said contact by the operator during the reversing operations, and when so held establishes a circuit connection of conductor 124 to conductor 156, arm 155, contact 160, conductor 157, including the reversing coil 159 for the reverse starter switch relay 163, conductor 158, contact 175, conductors 176 and 150, to the return line 125, thus energizing starter switch coil 159 and moving the contacts 164 and 165 to closed position. When this occurs, the field 142 for the motor 74 will be connected across the lines 124 and 125 since after passing through the coil 142 the current may then flow through conductors 145, 134, contact 165, conductor 166, to the conductor 125, and at the same time the reverse field coil 127 for the generator 126 is energized, the current passing from conductor 124 through resistance 128, field 127, conductor 133, conductor 134, contact 165, and conductor 166 to the conductor 125 so that current is supplied to the armature for the motor 74, but the generator 126 acts to turn the motor 74 in a reverse direction, i. e. to move the carrier B upwardly.

In order that this upward movement of the carrier will not be interfered with by the cable, the movement of the operating arm 155 into the reverse position and consequent energization of the starter reversing switch coil 159 acts as noted to move the contact 164 into connection with the conductors 167 and 168 which connects with the conductor 125, and since the conductor 167 connects with a conductor 177 and the conductor 180 connects with the conductor 124, the motor 79 is connected across the lines and acts to turn the hoist cable operating drum in a direction to pull the cable upwardly, but this occurs at a reduced speed due to the considerable resistance 169 which is then included in the motor circuit.

The motor 79 always runs in the same direction and is a high speed motor, for example, 1800 R. P. M. so that it returns the carrier B to its upper position in the construction here shown in a very short period of time.

The planer or other machine for producing relative movement between the work and the electrode may be driven in any suitable manner either through a prime mover or an electrical motor and connected through such a source of power to a clutch, preferably of the automatic engaging type which is thrown out by the action of a clutch release solenoid 185 whose coil 186 is shunted across the lines 124 and 125 by its connection with conductors 187 and 188. With such a construction when the coil 186 is energized, the armature 189 thereof is moved by the coil 186 to release the clutch. For controlling the solenoid 185 the branch conductors 188 and 187 have three switches arranged to close and open the circuit between them. One switch 190 is a manually operated push button switch which is closed so long as it is held down and releases automatically as soon as the operator takes his hand therefrom. The second switch 191 is one that is either closed or opened by manual operation by the operator, and the third switch 192 is a bridging contact connected with the armature of the pulsating series relay 120 and normally held in closed position by the spring 193.

With this construction when there is no load in the welding circuit, the armature 192 is in closed position and current from the generator 123 may pass from the conductors 124 to the conductor 188, the switch 192, and conductor 187 including the coil 186 to the other lead 125 of the generator circuit, thus energizing the coil and moving the solenoid member 188 to cause a release of the clutch connecting the prime mover with the planer so that the planer is stopped when the welding generator is not furnishing welding current. As soon as any load is imposed on the welding generator, as by a short circuit of the rod A with the work on the formation of the arc between the rod A and the work, the relay 120 opens thereby pulling the contact 192 out of engagement with the conductors 188 and 187 and thus de-energizing the coil 186 so as to cut out the clutch release and allow the prime mover to drive the planer. If during the welding operations it is necessary to stop the planer, the operator may do this momentarily by moving the push button 190 to closed position to establish the shunt circuit through the coil 186 for a brief period, or if for longer periods he may move the switch member 191 to closed position for the same purpose. Thus the control for the starting and stopping of the planer or the work travel means is manual by the direct control of the operator and automatic through the control of the welding circuit, and it is to be noted that the work travel means is operated only during the actual welding operation and that during the time the carrier B is moving down into welding position or back to receive a new rod, the travel means is not in operation.

We desire it to be understood that this invention is not to be limited to any particular form or arrangement of parts except in so far as such limitations are included in the claims.

What we claim as our invention is:

1. In a welding apparatus, the combination of a support for a plurality of welding rods, a welding rod carrier reciprocable between said support and the work, a welding rod gripper mounted on said carrier and having a charging position and a welding position, said gripper when in a charging position adapted to grip one end of the foremost of said rods and thereafter move to a welding position, and means for operating said carrier.

2. In a welding apparatus, the combination of a receptacle for holding rods in a substantially horizontal position above the work, a welding rod carrier vertically reciprocable between the receptacle and the work, a welding rod gripper mounted on said carrier and movable to a rod receiving position to grip one end of the foremost rod in said receptacle and thereafter tilt to a welding position, and means for operating said carrier.

3. In a welding apparatus, the combination of a reciprocatory carrier adapted to hold a welding rod, a rotary feed shaft, means for turning said feed shaft in one direction to bring the welding rod carried by said carrier into welding association with the work, a releasable drive connection between said carrier and feed shaft, means for releasing said drive connection when the rod is used up, and means operable on a release of said drive connection to move said carrier more quickly in the other direction.

4. In a welding apparatus, the combination of a reciprocatory carrier adapted to hold a welding rod, a rotary feed screw, means for turning said feed screw in one direction to bring the welding rod carried by said carrier into welding association with the work, a releasable nut member between said carrier and feed screw, means for releasing said nut member when the rod is used up, and means operable on a release of said nut to move said carrier more quickly in the other direction.

5. In a welding apparatus, the combination of a hopper, a reciprocatory carrier adapted to hold a welding rod, a rotary feed screw, means for turning said screw in one diretcion to bring the welding rod carried by said carrier into welding association with the work and in the opposite direction to form the welding arc, a releasable nut member between said carrier and feed screw means for releasing said nut member when the rod is used up, and a motor operated cable means to move said carrier when said nut member is released.

6. In a welding apparatus, the combination of a reciprocatory welding rod support, a hopper for welding rods, a tiltable releasable welding rod gripper on said support movable to a rod receiving position adjacent said hopper, said gripper thereafter tilting to bring the rod into a position for welding, means for moving the rod charged support to bring the rod thereon into and maintain it in welding association with the work, means for releasing the spent rod from said gripper and holding it in a release position until the support returns to a rod receiving position, and means for returning said support to a rod receiving position.

7. In a welding apparatus, the combination of a reciprocatory welding rod support, a hopper for welding rods, a tiltable releasable welding rod gripper on said support movable to a rod receiving position adjacent said hopper, said gripper engaging one end of the rod and thereafter tilting to bring the rod into a position for welding as said support moves to a welding position, means for moving the rod charged support to bring the rod thereon into and maintain it in welding association with the work, means controlled by the movement of said support for tilting the gripper to a rod receiving position when the welding rod is spent, means for releasing said gripper from the spent rod as the gripper tilts to rod receiving position and for holding said gripper in a rod receiving condition until said support reaches a rod receiving position, and means for returning said support to a rod receiving position.

8. In a welding apparatus, the combination of a reciprocatory carrier, an electrode holder mounted on said carrier and tiltable relative thereto to dispose the electrode carried thereby at an acute angle to the work, and means for operating said carrier.

9. In a welding apparatus, the combination of a reciprocatory carrier, an electrode holder mounted on said carrier and tiltable to different angular positions relative thereto, means for adjusting the angle of tilt of said holder, and means for operating said carrier.

10. In a welding apparatus, the combination of a reciprocatory welding head adapted to hold a welding rod, means for supp'ying welding current to said rod, electrically controlled and operated means for moving said head to bring and maintain the welding rod carried by said head in welding association with the work, and switch means for controlling said last named means and for controlling the welding current supply means said switch means including a manually controlled member for effecting a reversal of said head moving means.

11. In a welding apparatus, the combination of a welding head comprising a frame, a carrier mounted to reciprocate along said frame, and a tiltable releasable welding rod gripper mounted on said carrier to support a welding rod in spaced relation to said frame and carrier, means for reciprocating said carrier relative to said frame, and means controlled by the movement of said carrier relative to the frame to release said gripper from a welding rod and tilt the same from a welding position to a rod-receiving position.

12. In a welding apparatus, the combination of a reciprocatory carrier, an electrode holder pivotally mounted on said carrier to swing relative thereto from a rod-receiving position to a position for holding the rod in a welding position, and adjustable abutments mounted on said carrier engageable with said holder to adjust the angle of tilt of said holder relative to said carrier and thereby adjust the angle the welding rod on said holder makes with the work.

13. In a welding apparatus, the combination of a reciprocatory welding rod carrier, a support for welding rods, a tiltable releasable welding rod gripper on said support movable to a rod-receiving position adjacent said support, said gripper having a pair of pivoted jaws engaging said rod and thereafter tilting to bring the rod into a position for welding as said carrier moves to a welding position, spring operated means for swinging said gripper from a welding position to a rod-receiving position, means operable on the movement of said carrier for controlling said spring-operated means, wedge means engaging said jaws to release the used rod, and stop means engageable with said wedge means as the gripper moves to rod-receiving position to permit said jaws to engage a rod.

14. In a welding apparatus, the combination of a hopper, a reciprocatory carrier adapted to hold a welding rod, a rotary feed screw, means for turning said screw in one direction to bring the welding rod carried by said carrier into welding association with the work and in the opposite direction to form the welding arc, a releasable nut member between said carrier and feed screw, speed responsive operated means for releasing said nut member when the rod is used up, and a motor operated cable means to move said carrier at a faster rate than said feed screw when said nut member is released.

KLAUS L. HANSEN.
ALPHONSE V. HUENNEKENS.